United States Patent [19]
Tsukakoshi et al.

[11] 3,829,689
[45] Aug. 13, 1974

[54] SYSTEM FOR MEASURING AND RECORDING GAS CHROMATOGRAMS AND MASS SPECTRA BY A DIRECT COMBINATION OF A GAS CHROMATOGRAPH AND A QUADRUPOLE MASS SPECTROMETER

[75] Inventors: Osamu Tsukakoshi, Tokyo; Masashi Kiriya, Yokohama, both of Japan

[73] Assignee: Ulvac Corporation, Chigasaki-shi, Kanagawa-ken, Japan

[22] Filed: May 4, 1972

[21] Appl. No.: 250,372

[30] Foreign Application Priority Data
June 21, 1971  Japan............... 46-43975

[52] U.S. Cl................ 250/290, 250/292
[51] Int. Cl............................ H01j 39/34
[58] Field of Search......... 250/41.9 G, 41.9 D, 290, 250/292

[56] References Cited
UNITED STATES PATENTS
3,235,725  2/1966  Kendall................ 250/41.9 D
3,641,340  2/1972  Grinten et al............ 250/41.9 G
3,648,046  3/1972  Denison................. 250/41.9 G FOREIGN PATENTS OR APPLICATIONS
1,185,694  3/1970  Great Britain........... 250/41.9 G OTHER PUBLICATIONS
"Continuous Observation of Several Mass Peaks with Quad. Mass Spect.," Arthur et al., Rev. Sci. Ins., June 1966.

Primary Examiner—James W. Lawrence
Assistant Examiner—B. C. Anderson
Attorney, Agent, or Firm—P. D. Golrick

[57] ABSTRACT

A system for measuring and recording a gas chromatogram and a mass spectrum by a direct combination of a gas chromatograph and a quadrupole mass spectrometer in which the quadrupole mass spectrometer is used as the detector for the gas chromatograph. The two pairs of poles of the quadrupole mass spectrometer are supplied with predetermined radio-frequency voltages of suitable value and appropriate D.C. voltages for improved chromatograms and mass spectra.

10 Claims, 6 Drawing Figures

SYSTEM FOR MEASURING AND RECORDING GAS CHROMATOGRAMS AND MASS SPECTRA BY A DIRECT COMBINATION OF A GAS CHROMATOGRAPH AND A QUADRUPOLE MASS SPECTROMETER

This invention relates to a system for measuring and recording gas chromatograms and mass spectra by a direct combination of a gas chromatograph and a quadrupole mass spectrometer in which the quadrupole mass spectrometer is used as a detector for the gas chromatograph, and more particularly to an electronic control system which controls the mode of operation of said quadrupole mass spectrometer when it is employed to record a gas chromatogram and changes the mode of the operation when a single scan of mass spectrum is carried out.

In general, a gas chromatograph has an excellent ability to separate a mixture of gases into its individual components, but it has not by itself any definite means to identify the individual components successively leaving the gas chromatograph. The direct combination of gas chromatograph and mass spectrometer, which identifies the individual components separated by the gas chromatograph by taking a mass spectrum of its effluent, has come to be widely employed in recent years.

In that direct combination the pressure of the effluent from the gas chromatograph is reduced and the percentage of the sample components in the carrier gas is enhanced by an enricher or a separator feeding into the ion source of the mass spectrometer. The enrichment factor of separators now available amounts to about a hundred or so, that is, the percentage of the sample in the carrier gas is enhanced or increased by a factor of one hundred. When the sample is very small and its concentration in the carrier gas is very low, its percentage in the carrier gas is very small even after passing through the enricher and thus much carrier gas is delivered to the ion source along with the sample.

Moreover, with that direct combination the sample must be detected when in the ion source to record the gas chromatogram, in order to carry out the mass spectrum scan at the desired portion of the peak of the gas chromatogram.

To detect the sample in the ion source, it must be ionized as by electron bombardment, and measured as an electric current. When carrier gas is abundant in the ion source, it also is ionized by bombardment with electrons having energy above the appearance potential of the carrier gas, (usually helium).

Thus either the energy of bombarding electrons must be selected to be under the appearance potential of the carrier gas or means must be devised for detecting only sample ions. In the former case the sensitivity of the mass spectrometer greatly degenerates, so the latter method is preferable.

In the case of direct combination of a gas chromatograph and quadrupole mass spectrometer, the following procedure is usually employed. As the response time of the quadrupole mass spectrometer is very short when it is used at rather high pressures, it is scanned repeatedly from a mass number just above that of the carrier gas to an appropriately higher mass number, with the peaks of the mass spectrum being integrated at each scan and a plot being made of the total pressure thus diminished by the pressure of the carrier gas.

This is a plain and straight-forward procedure to detect selectively the sample gas when the carrier gas is also abundantly present, and affords good results when the amount of the sample is not too small. But when the concentration of the sample in the carrier is very low, requiring detection of small sample amounts and thus amplification of the output of a secondary electron multiplier of the analyser tube by a D.C. amplifier at its rather high sensitivity range, the response time is not fast enough for the above mentioned integration procedure.

It is accordingly an object of this invention to provide a novel method and apparatus by which the pressure of the sample gases may be selectively detected when the carrier gas is present in high proportions.

It is a more specific object of this invention to provide a system for measuring and recording gas chromatograms and mass spectra by a direct combination of a gas chromatograph and quadrupole type mass spectrometer, in which the latter is used as a detector for the former, and the two pairs of poles of the quadrupole are supplied with a constant radio-frequency voltage of suitable value, so that the ions whose mass is smaller than a pre-set value are unable to pass through the quadrupole section while all ions with larger mass are allowed to pass through to the detector.

In order that this invention may be more fully understood reference will now be made to the accompanying drawings which, by way of example only, illustrate a preferred embodiment of a system according to this invention.

Figure 1:
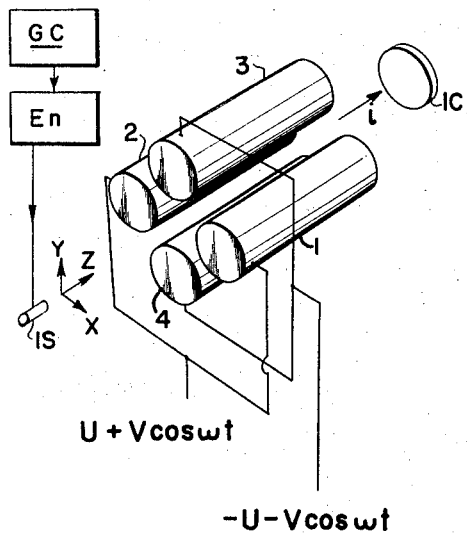
FIG. 1 is principally a generalized representation of a quadrupole section of quadrupole mass spectrometer.

As well known, in a quadrupole mass spectrometer, molecules of gases in an ion source IS are ionized by electron bombardment and sent into the quadrupole section with associated ion collector means IC. The quadrupole section is composed of four parallel hyperbolic or cylindrical rods 1–4 spaced symmetrically as electrodes or poles and electrically connected as shown in FIG. 1. To each pair of electrodes, there is applied D.C. voltage with a superimposed r.f. voltage, namely $U + V \cos \omega t$ and $-U - V \cos \omega t$ respectively.

If it is now assumed that the gap distance between the opposite cylindrical poles is denoted by $2r_o$, an ion injected into the quadrupole section undergoes an oscillatory movement according to the differential equations of Mathieu, i.e., the following equations of motion:

$$(d^2x/d\xi^2) + (a + 2q \cos 2\xi)x = 0 \qquad (1)$$

$$(d^2y/d\xi^2) + (a + 2q \cos 2\xi)y = 0 \quad (2)$$

$$d^2z/dt^2 = 0, \, dz/dt = \text{const.} \quad (3)$$

Here the parameters $a$ and $q$, and variable $\xi$ are given as follows:

$$a = 8eU/mr_o^2\xi^2, \, q = 4ev/mr_o^2\xi^2, \, \xi = \omega t/2 \quad (4)$$

where $e$ is the electronic charge, $m$ the mass of the ion and $t$ time.

Figure 2:
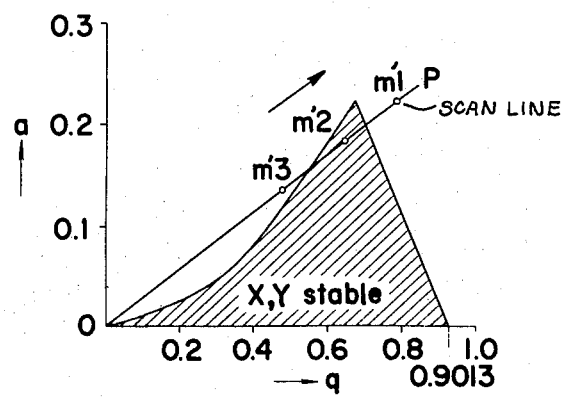
FIG. 2 is a graphic representation of the stable region of the guadrupole mass spectrometer operation.

When $a$ and $q$ take values in a region "$x$ and $y$ stable", the amplitude of oscillation is finite and the oscillation is called stable, but in other cases where the amplitude increases and tends to infinity the oscillation is termed unstable. In FIG. 2, the stability diagram is shown with the region "$x$, $y$ stable" marked with oblique lines. In FIG. 2, if it is now assumed that the straight line OP representing the equation $$a/q = C_1 \text{ (constant)}$$

crosses the stability diagram near its top, then from definitions 4 we have the following equation:

$$a/q = 2U/V = C_1 \quad (5)$$

This implies that the ratio $U/V$ of D.C. voltage $U$ and the peak value $V$ of r.f. voltage is kept to a constant value, i.e., ½ ($C_1$). And for a certain value of $V$, it is understood from the equations 4 that points $m_1'$, $m_2'$ and $m_3'$ can be selected on the line OP, each corresponding to ions whose masses are $m_1$, $m_2$, and $m_3$ respectively. Under the condition $$m_1 < m_2 < m_3,$$

and if $m_2'$ lies in a stable region and $m_1'$, $m_3'$ outside of it, the ion whose mass is $m_2$ can pass the quadrupole section, while an ion whose mass is $m_1$ or $m_3$ cannot pass through.

If we increase the values of $U$ and $V$, keeping the ratio $a/q$, therefore $2U/V$, to a constant value $C_1$, and $\omega$, hence frequency, to a constant value, for those respective ion masses the points $m_1'$, $m_2'$, $m_3'$ move on the straight line OP in the direction of the arrow as shown in FIG. 2, with $m_2'$ leaving, and $m_3'$ entering, the stable region.

Figure 3:
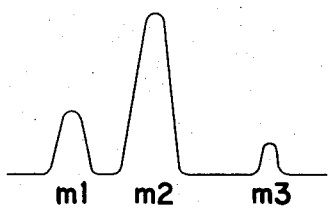
FIG. 3 is a graph showing the output signal of the mass spectrometer when scanning is carried out with a constant D.C. to r.f. voltage ratio U/V in the voltages applied to the quadrupole electrodes.

Then only the ion of mass $m_3$ can pass through the quadrupole section. If a scan is carried out keeping ratio $U/V$ to a constant value as above mentioned, a mass spectrum may be obtained say as shown in FIG. 3.

When D.C. voltage is reduced to null, namely $U = 0$, the scan line OP coincides with the $q$ axis, and points $m_1'$, $m_2'$, and $m_3'$ lie on the $q$-axis. Then under the condition $$v < (0.9013/4e) \, m_1 r_o^2 \omega^2 \quad (6)$$

points $m_1'$, $m_2'$ and $m_3'$ all lie inside the stable region, and the ions of masses $m_1$, $m_2$, or $m_3$ can all pass through the quadrupole section.

When the high frequency voltage $V$ is increased to a value which satisfies the condition $$(0.9013/4e)m_1 r_o^2 \omega^2 < V < (0.9013/4e) m_2 r_o^2 \omega^2 \quad (7)$$

the ion of $m_1$ cannot pass, but the ions of mass $m_2$ or $m_3$ can pass through the quadrupole section.

Figure 4:
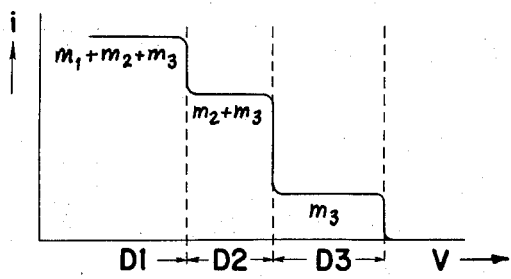
FIG. 4 is a graph showing the output signal of the mass spectrometer when scanning is carried out with the D.C. voltage U reduced to null (U = 0) and making the r.f. voltage V selectable.

If thus the peak value $V$ of r.f. voltage is increased from zero under the condition $U = 0$, a stair-like spectrum may be obtained as shown in FIG. 4 where the ordinate is the ion current $i$ provided by ions passing through the quadrupole section and reaching the ion collector IC. In FIG. 4, at the region $D_1$, the r.f. voltage $V$ satisfies the condition 6, and an ion whose mass is $m_1$, $m_2$, or $m_3$ can pass the quadrupole section. At the region $D_2$, $V$ satisfies the condition 7 and the ion whose mass is $m_2$ or $m_3$ can pass through the quadrupole section, and at the still higher voltage region $D_3$, the ion whose mass is $m_3$ is allowed to pass through the quadrupole section.

As appears from the explanation given above, when the D.C. voltage $U$ is reduced to null and the r.f. voltage $V$ has a constant value such that the ion of carrier gas is not permitted to pass through the quadrupole section, the quadrupole mass spectrometer serves as a sensitive detector for the gas chromatograph GC.

If helium is used as the carrier, there are present in the ion source of the quadrupole mass spectrometer, helium, the sample gas effluent from the gas chromatograph, impurity gas contained in the helium and the residual gases in the vacuum system. When the r.f. voltage is maintained at a constant value which satisfies the following condition:

$$(0.9013/4e) \, m_{He} r_o^2 \omega^2 < V < (0.9013/4e) \, m_c r_o^2 \omega^2$$

(where $m_{He}$ is the mass of an helium ion, and $m_c$ is the mass of a carbon ion), and the D.C. voltage $U$ is reduced to null, it is possible to detect the sum of the effluent sample gas, the impurity gas and the residual gases.

By a preliminary experiment, it became clear that the sum of the pressure of gaseous impurities in helium gas and of the residual gas in the vacuum system could be reduced to $1 \times 10^{-8}$ Torr, and the fluctuation of that sum over a period of 5 minutes held to 1 percent of $1 \times 10^{-8}$ Torr, or $1 \times 10^{-10}$ Torr as the noise level "N".

Under such conditions, the sensitivity of the quadrupole mass spectrometer used as the detector of gas chromatograph can be calculated as follows, where $Q_{MS}$: the quantity of sample which enters the ion source IS of the mass spectrometer from the enricher En, $Q_{GC}$: the quantity of sample which enters the enricher from the gas chromatograph GC, $H_{MS}$: the quantity of helium which enters the ion source from the enricher, $H_{GC}$: the quantity of helium which enters the enricher from the gas chromatograph, then the sample transmission Y and the enrichment factor E are given as:

$Y = (Q_{MS}/Q_{GC}) \times 100\%$, $E = (Q_{MS}/Q_{GC}) \cdot (H_{GC}/H_{MS}) = (Q_{MS}/H_{MS})/(Q_{GC}/H_{GC})$.

According to the data obtained experimentally employing the Watson-Biemann separator, the following values were obtained for Y and E:

$Y = 35\% \, E = 100$, where $H_{MS}$ was $2 \times 10^{-4}$ Torr $l$/sec namely 0.016 Atm. — cc/min, and the pumping speed of the vacuum system was 10 $l$/sec for air.

Assuming that 1 cc of a gas at atmospheric pressure and containing an extremely small quantity of another component, say 1 ppm, is sent into the gas chromatograph, and the duration time of the peak of the gas chromatogram of the minute component be 60 sec, and its peak height in the ion source be $x$ Torr, then we have the following equation:

$$\tfrac{1}{2}x \cdot 60 \cdot 10 \text{ Torr} \cdot l = 760 \cdot 10^{-3} \cdot 10^{-6} \cdot 0.35 \text{ Torr} \cdot l$$

and we get as the value of $x$:

$$X \approx 9 \times 10^{-10} \text{ Torr}.$$

As the fluctuation of the pressure other than that of the carrier gas in the ion source is of the order of $10^{-10}$ Torr for 5 minutes, it follows that we are able to detect the component of such a minute concentration as 1 ppm at $S/N = 9$. In fact, n-butane has been detected in air down to a concentration as low as 0.2 ppm.

Figure 5:
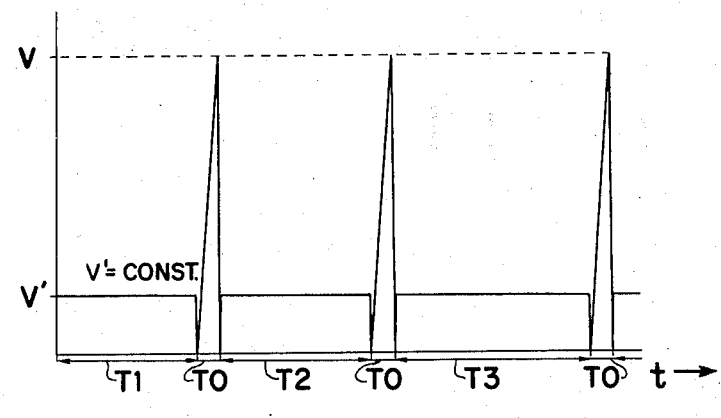
FIG. 5 is a representation of the r.f. peak voltages of the quadrupole sweep i.e., scan, signal produced and used in the practice of this invention.

In order to record a single scan at each apex of the peak of a gas chromatogram, r.f. and D.C. voltages are applied to the quadrupole section as next described relative to FIG. 5, wherein the ordinate indicates the peak value of r.f. voltage V and the abscissa indicates the time.

The period $T_o$ is chosen as for instance 10 seconds, and within this period the ratio $2U/V$ is kept at a constant value $C_1$, where $C_1$ is set to a value at which the quadrupole mass spectrometer has an appropriate resolution. At periods $T_1, T_2, \ldots$ the D.C. voltage U is reduced to null and the peak value of the r.f. voltage is kept at a constant value $V'$ which satisfies the following condition:

$$(0.9013/4e)\, m_{He} r_o^2 \omega^2 < V' < (0.9013/4e) m_c r_o^2 \omega^2$$

As is clear from the explanation given above, in this way the recording of the mass spectrum is carried out at period $T_o$, while under the condition $$T_o << T_1, T_2 \ldots,$$

gas chromatograms may be obtained during periods $T_1, T_2 \ldots$

Figure 6:
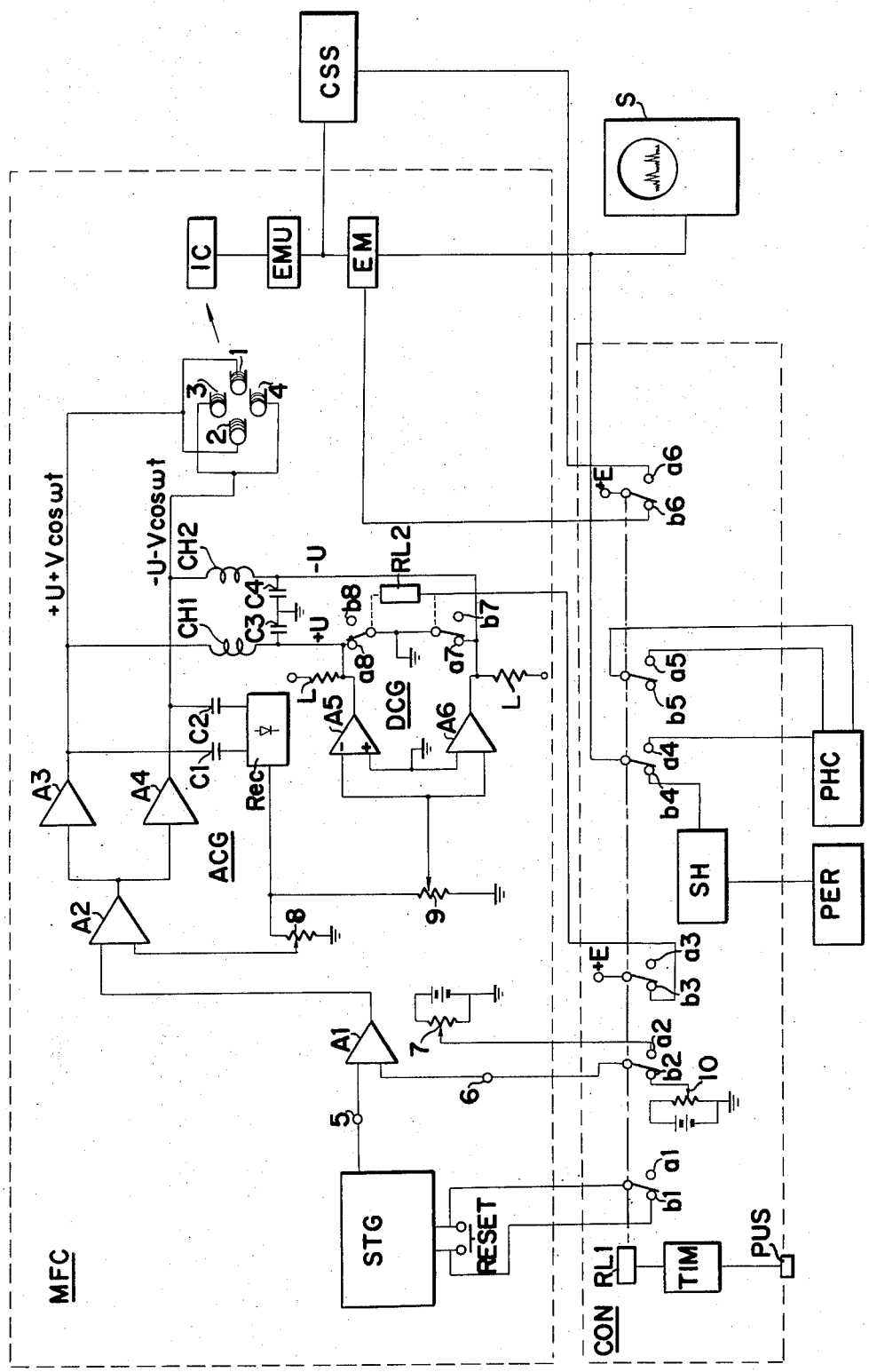
FIG. 6 is a block and schematic diagram showing one embodiment of a system according to this invention.

In FIG. 6 is shown a system control circuit for the chromatograph and the spectrometer intended to measure and record the mass spectrum and the gas chromatogram, in which the upper and lower dotted rectangles in the figure enclose respectively a controller MFC for the mass spectrometer and a control mechanism CON for switching the mode of operation of the quadrupole mass spectrometer to record the gas chromatograms or the mass spectra.

The controller MFC comprises D.C. voltage generator DCG which supplies the D.C. voltage U or $-U$ (hence of equal absolute value $|U|$) to the rods 1–4 of the quadrupole mass spectrometer, and a radio-frequency voltage $V\cos\omega t$ or $-V\cos\omega t$ (hence A.C. components of equal absolute values) to the same four rods 1–4. To an input terminal 5 is connected a sweep generator STG for generating saw-tooth voltage, and a comparator $A_1$ is provided to compare the sweep voltage and the reference voltage from potentiometer 7 to select the mass number of the center of the scanned mass spectra; that is, this potentiometer shifts the spectrum display to put the desired portion of the spectrum at the center of the oscilloscope S. This differential output voltage of $A_1$ is applied at $A_2$ to the radio frequency generator ACG, which generates the radio frequency voltage with frequency constant and with amplitude proportional to the input sweep voltage. The r.f. voltage is generated, amplified in push-pull self oscillators $A_3$ and $A_4$, and supplied to the paired electrode rods 1–2, and 3–4 as the voltages $V\cos\omega t$ and $-V\cos\omega t$ respectively.

Those r.f. voltages are applied through capacitors $C_1$ and $C_2$ to and rectified by radio frequency rectifier Rec, the output of which is fed in part back to D.C. amplifier $A_2$ through the potentiometer 8 to enhance the stability of the ampltiude in the radio frequency voltage, and in part applied as the input voltage of the D.C. voltage generator DCG through potentiometer 9 for the resolution adjustment.

From this input voltage a positive voltage $(+U)$ and a negative voltage $(-U)$ are produced by D.C. amplifiers $A_5$ and $A_6$, provided with equal load resistors L and maintaining the same absolute value of output voltage. Those output voltages $+U$, $-U$ are respectively applied to the pairs 1–2 and 3–4 through filters comprising radio frequency choke coils $CH_1$, $CH_2$ and capacitors $C_3$, $C_4$ respectively.

Consequently those D.C. voltages and radio frequency voltages are superimposed on each other providing the resultant voltages $U + V\cos\omega t$, $-U - V\cos\omega t$ applied respectively to those rod pairs. The ratio $U/V$ is set to a suitable value through the potentiometer 9.

When the ions are sent to the quadrupole region, i.e., the space enclosed by the rods, they are analyzed as stated above. The analyzed ions are collected by ion collector IC, multiplied by electron multiplier EMU, and the output applied through electrometer EM to the vertical input terminal of oscilloscope S. With the saw-tooth voltage from the sweep generator STG applied to the horizontal input terminal of the oscilloscope, then the mass spectrum may be displayed on the scope. These components and their function are for the most part the same as in the normal quadrupole mass spectrometer.

Now, when the controller is operated to record the gas chromatograms and the mass spectra, the radio frequency voltage is fed to the rods as shown in FIG. 5.

At the periods $T_1, T_2, \ldots$ in FIG. 5, during which the guadrupole mass spectrometer operates as a detector of the gas chromatograph, relay $RL_1$ opens contacts $a_1 - a_6$ and closes contacts $b_1 - b_6$. By closing of the contact $b_1$ the saw-tooth voltage is set to zero. By the contact $b_2$ constant voltage from the reference D.C. voltage supply 10 is fed to the comparator $A_1$. Thus, the radio frequency voltage V (V = V' as stated above) of constant amplitude is generated in the radio frequency generator ACG, and fed to the rods 1–4.

The contact $b_3$ from supply voltage $+E$ energizes relay $RL_2$ to close the contacts $a_7$ and $a_8$ thereby to ground the output of the load resistor R in the D.C. voltage generator DCG whereby zero D.C. output voltage (U = 0) is obtained. In this way, with the contact settings of FIG. 6, the quadrupole mass spectrometer operates as the detector of the gas chromatograph. The output signal from the detector is given to signal holding circuit SH through the contact $b_4$.

When the display of the mass spectra is to be effected by photo-recorder PHC during $T_o$, the contact $b_4$ is opened, the contact $a_4$ is closed, and then the input signal for the signal holding circuit SH disappears, but the circuit SH operates to hold the input voltage for the period $T_o$. After the period $T_o$, the display of the gas chromatogram may be again effected. For the condition of $T_1, T_2, \ldots >> T_o$, the form of the peaks of the gas chromatogram is not influenced very much. The peaks of gas chromatograms are recorded by pen-recorder PER in a serial form. During these periods $(T_1, T_2 \ldots)$, since the contacts $a_4$ and $a_5$ open, the recording of the mass spectra stops.

When recording of the gas chromatogram is carried out, the ion current is usually (for example, 10–100 times) greater than that obtained at the time of the scan of a mass spectrum, so the contact $b_6$ closes which operates to decrease the gain of the electrometer. At the same time, a small electric current, reversed in polarity relative to the output current of the multiplier, may be optionally applied to the input side of the electrometer from suppression current source CSS. By this method, the variable part of the peaks of a gas chromatogram may be displayed in large scale. At the top of the peak of the gas chromatogram, the scan by the mass spectrometer is carried out for only the short time $To$. When for this purpose pre-set timer TIM is switched on by push switch PUS, the contacts $a_1 - a_6$ of the relay $RL_1$ close (opening $b_1 - b_6$) for the time ($To$) only. Then the configuration for the mass scan is set up by the opening of the contacts $a_7$ and $a_8$ at the relay $RL_2$, consequent upon $b_3$ opening, and the controller works to provide the r.f. peak voltage change for the time $To$ as shown in FIG. 5.

At first, the contact $b_1$ is opened so the reset switch of the saw-tooth voltage generator STG is opened, and $a_2$ closed; therefore, the sweep voltage is generated and, with the constant D.C. voltage through potentiometer 7 from its reference voltage source, is applied to the comparator $A_1$ to begin the first scan from the mass number $m/e = 1$. The r.f. voltage V is generated by the radio-frequency generator ACG, and at the same time, as now the contact $b_3$ is open, hence also the grounding contacts $a_7 - a_8$ controlled by $RL_2$, the voltage U from D.C. voltage generator DCG is applied with the r.f. voltage to the rods 1–4 to satisfy the condition $2U/V = C_1$, i.e., $U/V = C$.

As the result, the voltages $\pm (U + V \cos\omega t)$ are supplied to the rods 1–4, and the single scan of mass spectra is carried out. This scanned spectrum is observed at the oscilloscope S displaying the signal from the electrometer EM, and at the same time, the mass spectra are recorded by the photo-recorder PHC through the closure of the contact $a_4$. During the time $To$, the sensitive paper is dilivered from PHC at high speed by the closure of the contact $a_5$, and the mass spectrum is recorded optically by the photo recorder PHC. During the scan of mass spectra by opening $b_6$, the sensitivity of the electrometer EM is increased by changing its feed back ratio and cutting off the suppression current.

It is very convenient that this series of operations is commenced by pressing one push button to switch from the gas chromatogram to the mass spectra. The data for the identification of the sample, namely, the mass spectrum are prepared at the desired part of the gas chromatogram. In the example above, we can choose as the constant radio frequency voltage V' such a value that ions of carrier gas cannot pass through the quadrupole section.

While this invention has been described in detail with respect to a certain now preferred embodiment of the invention, it will be understood by those skilled in the art that various changes and modifications may be made without departing from the spirit and scope of the invention, and it is intended, therefore, to cover all such changes and modification in the appended claims.

We claim:

1. A system for measuring and recording gas chromatograms and mass spectra comprising:
    the combination of a gas chromatograph with a quadrupole mass spectrometer,
    said spectrometer including voltage generator means to apply, to opposed-pole pairs of the quadrupole thereof, respective resultant voltages
    of equal absolute values
    but of respectively opposite instantaneous polarities,
    each resultant voltage comprised of a D.C. voltage component and a radio-frequency A.C. voltage component,
        the absolute values of the D.C. voltage components being equal,
        the absolute values of the A.C. voltage components being equal,
    and control means for the quadrupole of said mass spectrometer, said control means including
    first means to reduce the said D.C. voltage components to null and
    second means effective, while the D.C. voltage components are reduced to null, to supply the quadrupole with said radio-frequency voltage components of a constant absolute peak value
        such that ions of carrier gas and ions having mass number smaller than that of the carrier gas are prevented from passing through the quadrupole, whereby said spectrometer is enabled to measure and record ion flow corresponding to the sum of the pressures of gases other than the carrier gas and thereby to plot a gas chromatogram;
    and further including
    third means for varying continuously the voltages applied to the quadrupole and maintaining a constant ratio of the absolute value of the D.C. voltage components to the absolute peak value of the A.C. components, during the very short period at the peaks of the gas chromatogram to carry out a single scan of the mass spectrum.

2. A system as described in claim 1, wherein
    the said third means controls said generator means to provide said radio-frequency voltage components of increasing absolute peak values and D.C. voltage components of increasing absolute values during each said short period, and maintains said constant ratio of the D.C. to peak A.C. values.

3. A system as described in claim 2 including
    an oscilloscope for observing the output of the quadrupole spectrometer,
    and relay means effective
        at one setting, for producing a chromatogram to actuate said first means to reduce the D.C. voltage components to null and to activate the said second means to supply the quadrupole with radio-frequency voltage of said constant peak value, and
        at a second setting, for actuating said third means for changing the voltages applied to the quadrupole for carrying out a single scan of a mass spectrum,
    push-button activated timer means actuating said relay means from said first setting to said second setting for a preselected short duration, whereby said second setting may be accomplished by push button operation upon the occurrence of a gas chromatogram peak.

4. A system as described in claim 1 comprising:
a radio-frequency A.C. generator and a D.C. generator as said voltage generator means,
said radio-frequency A.C. generator generating a fixed frequency and including
two self-oscillators in push-pull arrangement
jointly controlled, driven by a first D.C. amplifier establishing the r.f. amplitude proportional to voltage of the D.C. amplifier input,
and having respective outputs applied
as said A.C. components to the respective pairs of opposed poles of the said quadrupole
and also to a radio-frequency rectifier with output providing feedback to said D.C. amplifier for stabilizing the amplitude of the radio-frequency generator
and also providing the hereinafter-named common D.C. input,
said D.C. generator comprising two D.C. amplifiers providing equal D.C. outputs of opposite polarities as said D.C. components
fed through radio-frequency filter means to respective pairs of said poles,
said D.C. outputs proportional to said common D.C. input applied to said two D.C. amplifiers, thereby to establish said constant ratio of D.C. to peak A.C. values,
a saw tooth generator,
a comparator for applying a differential voltage, derived from a D.C. reference voltage and the output of the saw tooth generator as the input of the first D.C. amplifier,
whereby the A.C. generator is driven to produce, in the course of each saw tooth cycle, outputs of increasing peak value of amplitude,
grounding means actuatable for grounding the outputs of said two D.C. amplifiers as said means to reduce the said D.C. components to null,
first and second D.C. reference voltage sources,
and relay means effective
on a first relay setting and ineffective at a second setting
to deactivate the saw tooth generator,
to apply the first D.C. reference voltage source to said comparator thereby to cause said A.C. generator to produce said voltages of a constant peak value, and to actuate said grounding means to ground the D.C. outputs,
whereby at the first setting the system is enabled for gas chromatogram production,
on said second setting is effective
to apply said second reference voltage source to said comparator in conjunction with said saw tooth output thereby to cause said A.C. generator to produce r.f. outputs with increasing peak voltages, and to deactivate said grounding means,
whereby at said second setting the system is enabled for a mass spectrum scan.

5. A system as described in claim 4, including
first potentiometer means through which said common D.C. input is applied from said rectifier to said two D.C. amplifiers thereby to select said constant ratio of D.C. to peak A.C. values;
and second potentiometer means included in the first said reference voltage source to establish the reference voltage applied to said comparator during the said first setting of the relay means,
whereby said constant absolute peak value of said radio-frequency voltages is selectable.

6. A system as described in claim 4, wherein
said mass spectrometer includes means producing a spectrometer output signal proportional to gas ions passing through said quadrupoles,
said system further comprising
a gas chromatogram recording pen recorder and a signal holding circuit therefor, and
a mass spectrum recording photochart recorder;
said relay means further effective
on said first setting, to apply said spectrometer output signal through the signal holding circuit to said pen recorder, and on said second setting to apply said spectrometer output signal to said photochart recorder and simultaneously to activate a chart drive thereof.

7. A system as described in claim 6 including
pushbutton activated timer means actuating said relay means from said first setting to said second setting for a pre-selected said short duration and thereafter restoring said first setting
whereby said second setting may be attained by push button operation upon observed occurrence of a gas chromatogram peak.

8. A system as described in claim 7, further including an oscilloscope to which
the said spectrometer output signal is applied as the vertical input and
the output of said saw tooth generator is also applied, as the horizontal input,
whereby mass spectra may be displayed on the oscilloscope.

9. A system as described in claim 7, wherein
said means producing the spectrometer output signal includes an adjustable gain electrometer providing said output signal, an electron multiplier for enhancing the ion current arising in an ion collector for the quadrupole and providing an input to the electrometer, and
means rendered effective upon said first setting of said relay means to decrease the gain of said electrometer.

10. A system as described in claim 8, including
third potentiometer means included in the second said reference voltage source to establish the reference voltage applied to said comparator during said second setting of the relay means, whereby the mass number of the center of a scanned mass spectrum may be selected.

* * * * *